Patented Oct. 17, 1922.

1,432,289

UNITED STATES PATENT OFFICE.

WALTER BIRKETT HAMILTON, OF LANCASTER, AND THOMAS ALLEN EVANS, OF MANCHESTER, ENGLAND.

METHOD OF REDUCING METALS AND MAKING ALLOYS.

No Drawing.     Application filed May 23, 1922. Serial No. 563,020.

*To all whom it may concern:*

Be it known that we, WALTER BIRKETT HAMILTON and THOMAS ALLEN EVANS, subjects of the King of England, residing at Lancaster and Manchester, England, respectively, have invented new and useful Improvements in Methods of Reducing Metals and Making Alloys, of which the following is a specification.

We have discovered that if chromium ore (chromite) be introduced, together with aluminum, into a suitable slag on top of molten iron in a furnace, that the entire body of the ore, with all its difficultly-fusible components (magnesia, etc.), will be fused; and that the chromium oxide and iron oxide contained therein will be reduced; and that the chromium and iron so formed will descend into the molten metal, while the other components of the ore will be retained in the slag; and that the slag not only acts as a flux which promotes the fusion of the ore, but protects the molten metal beneath it from contamination by the carbon electrodes (if an electric furnace be used) or from contamination by the heating gases (if a furnace of the open-hearth type be used); and that it also acts after reduction has taken place as a refining agent for the molten metal.

By this process, for example, rustless iron substantially free of carbon, may be cheaply produced containing any desired percentage of chromium; or rustless steel, may be cheaply produced containing any desired percentage of chromium and carbon. The former has technical advantages over the latter in that it is rust-resisting without hardening and may be readily drawn and worked, while the latter to be rust-resisting must be hardened and cannot be readily drawn and worked.

In the practice of our invention the metal is brought to a molten condition, and a suitable slag is formed on the top thereof. The ore and the thermo-reducing agent are added to the slag when the temperature of the slag is such that, with the calories generated by the exothermic reaction of these materials, it will melt the ore. Thereupon the oxide of metal is reduced and by gravity the metal separates from the molten slag and descends into the molten metal beneath, while the other ingredients of the ore remain in the slag.

Instead of alloying iron (with or without carbon) with chromium, it may be alloyed with tungsten, nickel, manganese or the like, by introducing into the molten slag ores containing the oxides of such metals.

The following is an example of the practice of our process, but it will be understood that our claims are not limited thereby or thereto:

The furnace may be charged with 1000 pounds of iron scrap (substantially carbon-free or containing any amount of carbon) and 8% or 10% limestone which is brought to a molten condition. The first slag formed thereon is completely removed to eliminate impurities which otherwise would be reduced back into the iron. The molten metal is then covered with, preferably, a mixture of 60 lbs. limestone, 18 lbs. fluor spar and 12 lbs. mill-scale. Heat is applied until the reception slag formed thereby is brought to a molten condition. When the slag is brought to a temperature sufficient to effect reduction, 450 pounds of chromite (chromium ore), preferably ground and calcined, with approximately 120 pounds of aluminum, are gradually added to the slag. The reaction between the oxides of the metals and the reducing agent is, as is well known, exothermic. Within a few minutes after the completion of the addition of the ore and thermo-reducing agent, the reduction of the metals will be completed and the reduced metals will have entered the molten mass beneath the slag. It is desirable to continue the application of heat for a short time thereafter to refine the resulting alloy. The furnace employed may be electrical or it may be the usual open-hearth type; but in case rustless iron is the desired product, the use of carbon for the preparation of the melting hearth should be avoided. If the chromite does not give the amount of manganese desired in the finished iron, manganese ore also may be added to the flux.

In the above example, if the furnace has been charged with scrap iron substantially carbon-free, the resulting product will be a chromium-iron alloy containing approximately twelve per cent. chromium and less than 0.14% carbon. If the furnace has been charged with scrap steel, the resulting product will be a chromium-steel alloy containing approximately twelve per cent. chromium, and whatever carbon remains or has been added.

If the furnace be charged with ferrochrome (containing, say, 60 parts of chromium to 40 parts of iron), ferrochrome will be the resulting product, because chromium and iron are present in chromite in about the same proportions as in ferrochrome. So approximately pure metal may be made by this process if the ore added contains, practically speaking, the oxide of only one metal, by charging the furnace with the same metal. So bronze may be made by this process by charging the furnace with copper and adding to the molten slag tin ore. So aluminum bronze may be made by this process by charging the furnace with aluminum and adding to the molten slag copper ore. It is obvious that other alloys may be made by this process, but the above examples are sufficient for a full understanding of the same.

Instead of using aluminum as the reducing agent, other thermo-reducing agents such as silicon, magnesium, or the like may be used. Instead of using a lime flux in which the reduction takes place, other suitable fluxes not reduced by the reducing agent employed may be used.

The word "oxide" herein will be understood to include chlorides, fluorides, and the like, not volatilized in the presence of the reagent employed. The word "ore" herein will be understood to include other compositions of metallic oxides and refuse matter, such, for example, as exist in certain dumps.

Having now described our invention, we claim:

1. The process of making rust-resisting metal which consists in charging a furnace with iron, melting the same, forming a slag thereon and adding to said slag ore containing chromium oxide in the presence of a thermo-reducing agent, whereby the ore is fused, the oxide is reduced and the resulting chromium descends into the molten metal beneath the slag.

2. The process of making rust-resisting metal which consists in charging a furnace with iron and a slag-forming material, melting the same, removing the slag thus formed, adding to the molten metal material to form a reception slag and adding to said reception slag ore containing chromium oxide in the presence of a thermo-reducing agent, whereby the ore is fused, the oxide is reduced and the resulting chromium descends into the molten metal beneath the slag.

3. The process of making alloys which consists in charging a furnace with a suitable metal, melting the same, forming a slag thereon and adding to said slag ore containing a suitable metal oxide in the presence of a thermo-reducing agent, whereby the ore is fused, the oxide is reduced and the resulting metal descends into the molten metal beneath the slag.

4. The process of making an alloy containing chromium and iron which consists in charging a furnace with a suitable metal, melting the same, forming a slag thereon and adding to said slag ore containing chromium and iron oxides in the presence of a thermo-reducing agent, whereby the ore is fused, the oxides are reduced and the resulting metals descend into the molten metal beneath the slag.

5. The process of reducing metal and separating it from ore which consists in charging a furnace with a suitable metal, melting the same, forming a slag thereon and adding to said slag ore containing a suitable metal oxide in the presence of a reducing agent exothermic in its action with respect to said metal oxide, whereby the ore is fused, the oxide is reduced and the resulting metal descends into the molten metal beneath the slag.

6. The process of making alloys which consists in charging a furnace with a suitable metal, melting the same, forming a slag thereon, adding to said slag ore containing a suitable metal oxide in the presence of a reducing agent exothermic in its action with respect to said metal oxide, whereby the ore is fused, the oxide is reduced and the resulting metal descends into the molten metal beneath the slag, and maintaining the temperature of the slag until the molten metal is refined.

7. The process of reducing ferrous metals and separating them from ore, which consists in adding to molten slag in a furnace ore containing a suitable metal oxide and a reducing agent which does not form a direct compound with the metal present, whereby the ore is fused, the oxide is reduced and the resulting metal descends beneath the slag.

8. The process of reducing metal and separating it from ore, which consists in adding to molten slag in a furnace ore containing a suitable metal oxide and a reducing agent exothermic in its action with respect to said metal oxide, whereby the ore is fused, the oxide is reduced and the resulting metal descends beneath the slag.

In testimony whereof we have signed our names to this specification.

WALTER BIRKETT HAMILTON.
THOMAS ALLEN EVANS.